Jan. 18, 1966 D. E. STUDWELL 3,229,811
PLUG FOR MOUNTING TAPE REELS
Filed July 26, 1963
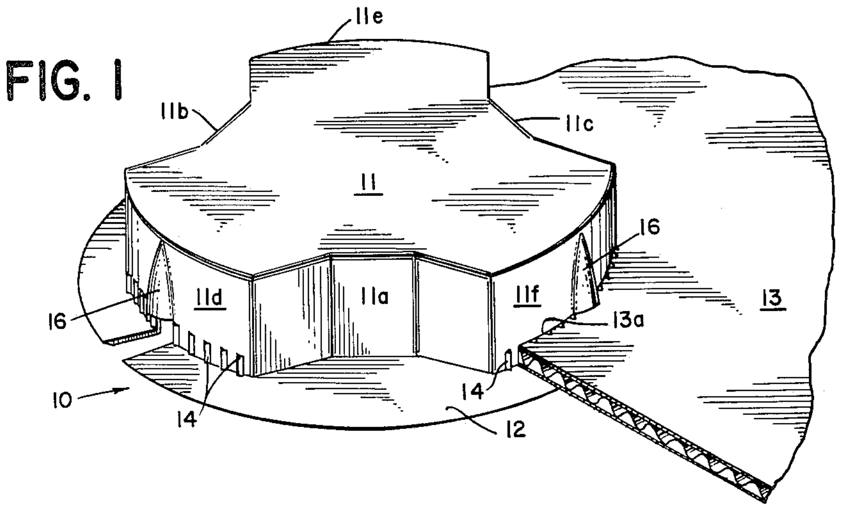
FIG. 1
FIG. 2
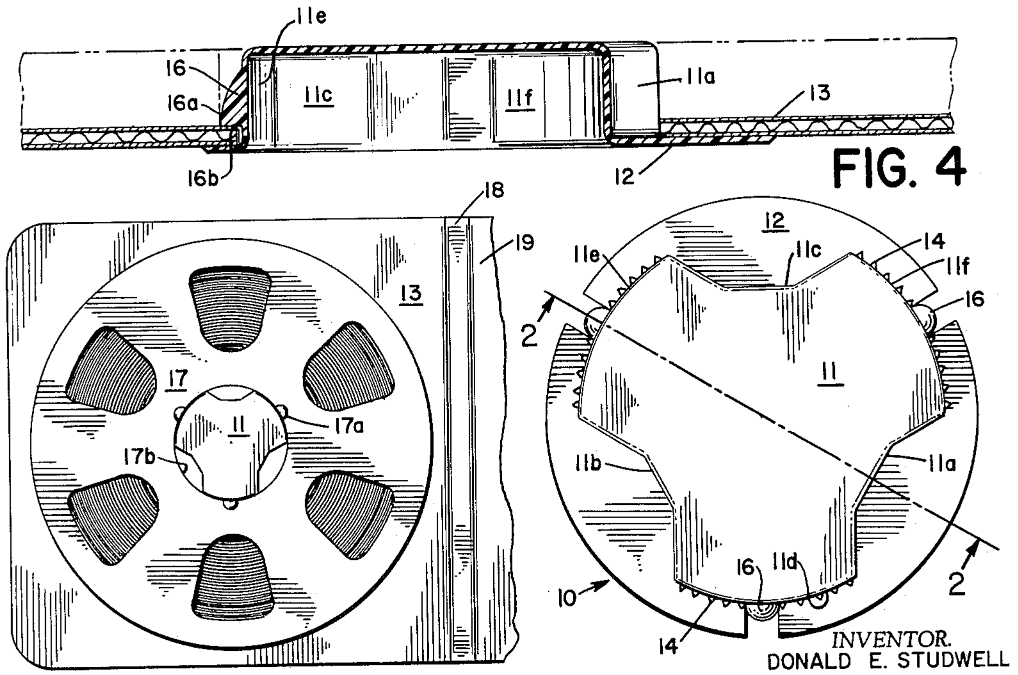
FIG. 2, FIG. 4
FIG. 3
INVENTOR.
DONALD E. STUDWELL
BY Pennie, Edmonds, Morton, Taylor and Adams
ATTORNEYS United States Patent Office 3,229,811
Patented Jan. 18, 1966

3,229,811
PLUG FOR MOUNTING TAPE REELS
Donald E. Studwell, Stamford, Conn., assignor to Audio Devices, Inc., New York, N.Y., a corporation of New York
Filed July 26, 1963, Ser. No. 297,763
5 Claims. (Cl. 206—52)

This invention relates generally to mounting means for tape reels and more particularly to a novel plug having improved means for securing same in a complementary cardboard panel which serves as a packaging container for the tape reel when mounted upon the plug.

In accordance with the invention, a mounting plug for tape reels and the like has been devised comprising a generally cylindrical plug body having an annular flange extending radially from one edge of the body. The cylindrical portion is adapted for insertion and closely fitted within a circular opening in a cardboard panel forming one wall of a container or package for the tape reel. Thus, when the mounting plug for the tape reel is inserted within the cardboard panel, the radial flange will be seated against an outside wall surface of the panel while the generally cylindrical plug body protrudes from the inside wall surface of the panel in order to receive a tape reel.

In accordance with features of the present inventive improvements, the plug body defines a plurality of irregularities such as knurled surface portions about its periphery immediately adjacent to the flange. These irregularities grip the sides of the circular opening in the cardboard panel to prevent relative rotation between the plug and panel once the former has been inserted. The plug body has also a plurality of spaced tape reel mounting projections which protrude from the body next adjacent axially with respect to the gripping surface irregularities. The projections serve as interlocks between the tape reel and the mounting plug and also, subsequent to the insertion of the plug in the cardboard panel, projection over the interior surface of the panel to prevent withdrawal of the plug from the panel. As a further feature, the cylindrical body portion of the plug is recessed intermediate the mounting projections for the tape reel in order to provide a clearance for the insertion of the fingers or thumb of a person wishing to remove the reel from the mounting plug.

In the following description reference is made, by way of a non-limiting example, to one form of construction of a tape reel mounting plug devised in accordance with the invention, and illustrated in the accompanying drawing in which:

FIG. 1 is a perspective view of the new mounting plug for tape reels showing its association with a portion of a corrugated cardboard panel;

FIG. 2 is a lateral cross-sectional view of the plug and panel of FIG. 1 as indicated by the section taken in FIG. 4;

FIG. 3 is a plan view of a tape reel mounted upon the plug of the invention in a cardboard folder which has been partially illustrated; and FIG. 4 is a plan view of the mounting plug according to the invention.

Referring now to the drawing, and initially to FIG. 1, a mounting plug 10 constructed according to the invention has been illustrated. Plug 10 comprises a generally cylindrical body 11 whose periphery has been recessed in three places 11*a*, 11*b* and 11*c* for a reason which will appear presently. In the illustrated embodiment, the plug 10 is molded entirely of plastic and the body 11 of the plug is integrally connected to a circular radial flange 12. The plug body 11 may be inserted through an opening 13*a* defined in a panel 13 which is made of relatively heavy corrugated cardboard, and the plug body 11 thereafter may be used as a core to mount tape reels, as will be understood.

Each of the cylindrical outer surfaces 11*d*, 11*e* and 11*f* of the body 11 includes a plurality of surface irregularities in the form of knurled projections 14 which are immediately adjacent to the flange 12. When the plug body 11 is inserted within the opening 13*a*, the irregularities or projections 14 bite into and grip the sides of the opening 13*a* to prevent relative rotation between the panel 13 and the plug 10. Additionally, each of the cylindrical surfaces 11*d*–11*f* have tape reel mounting projections 16 which as best seen in FIG. 3, are received within corresponding grooves 17*a* defined about the center opening 17*b* of a tape reel 17. The projections 16 thus prevent relative rotation between the tape reel 17 and the plug body 11, with the latter being held against rotation by the gripping projections 14 with respect to the cardboard panel 13.

The projections 16 are further constructed as illustrated in FIG. 2 to have a wedge-shaped arcuate outer surface 16*a* which tapers outwardly from a point contiguous to the upper edge of the plug body 11 to a lowermost position thereby forming a lip 16*b* which may project over edge portions of the opening 13*a*. The cardboard possesses sufficient resiliency to spring back under each of the lips 16*b* after insertion of the plug body in the opening 13*a*. It will be noted in FIG. 2, that the flange 12 rests immediately adjacent to the outside surface of the panel 13 while each of the lips 16*b* of the tape reel mounting projections 16 projects over the inside surface of the panel 13, thus securing the plug against withdrawal from the panel.

With reference to FIG. 3, the fully loaded tape reel 17 may be seen in position mounted upon the plug body 11. When in this position, the recessed portions 11*a*–11*c* which lie intermediate the cylindrical outer portions 11*d*–11*f* of the plug body permit a person to insert his thumb, for example, intermediate the periphery 17*b* of the center opening in the tape reel and the body of the plug, with the remaining fingers grasping the outer perimeter of the reel. In this fashion, the tape reels are readily grasped and removed from the mounting plug of the invention. The panel 13 preferably is joined by a fold 18 to an adjacent integral flap 19 such that the combination of the panel 13 and flap 19 serve as a container for the reel 17 when the latter is installed upon the mounting plug. Thus, the reel when mounted upon the plug as illustrated, may be stored endwise upon a shelf for ready accessibility when needed, or may be shipped within the cardboard container as a packaged unit.

It will be understood that the foregoing description has related to a particular embodiment and is merely representative. Therefore, in order to appreciate fully the spirit and scope of the invention, reference should be made to the appended claims in which I claim:

1. A mounting plug for tape reels and the like comprising a generally cylindrical plug body, an annular flange extending radially from one edge of said body, outwardly extending projections disposed on the surface of said cylinder immediately adjacent to said flange for gripping wall portions of a cardboard panel when said body is fitted in an opening defined therein to prevent rotation of said plug relative to said panel, a plurality of tape reel mounting means projecting from said body radially beyond said outwardly extending projections at next adjacent locations spaced axially from said flange for projecting over and into engagement with inside portions of the cardboard panel in opposition to said flange when seated against outside portions thereof to hold the plug from ready withdrawal from the opening in said panel.

2. The mounting plug according to claim 1 in which the plug body is recessed intermediate said reel mounting means for insertion of fingers adjacent to the plug body and between the internal periphery of a tape reel when the latter is seated upon the plug body.

3. The mounting plug according to claim 1 in which the mounting projections are generally wedge-shaped, tapering from a point adjacent to the upper surface of said body to a lowermost position forming lips which overhang the panel when the plug body is inserted therein.

4. A mounting plug assembly for tape reels and the like comprising a generally cylindrical plug body, an annular flange extending radially from one edge of said body, a relatively heavy corrugated cardboard panel having wall portions defining a circular opening therein positioned on said flange with the body of said plug projecting through said opening, outwardly extending gripping projections disposed on the surface of said cylinder immediately adjacent to said flange and extending into said wall portions of said panel for preventing rotation of said plug relative to said panel, a plurality of tape reel mounting means projecting from said body at next adjacent locations spaced axially from said flange, said reel mounting means being generally wedge-shaped and tapering from a point adjacent to the upper surface of said body to a lowermost position forming lips which overhang said panel, the wall thickness of said panel being somewhat less than the spacing of the lips of the reel mounting means from the panel supporting surface of said flange, and said panel being integrally secured to a flap with a portion intermediate said panel and flap comprising a flexible fold permitting said flap to fold over and lie adjacent to said panel when a tape reel is secured upon the plug body.

5. The mounting plug according to claim 4 in which the plug body is recessed intermediate said reel mounting means for insertion of fingers adjacent to the plug body and between the internal periphery of a tape reel when the latter is seated upon the plug body.

References Cited by the Examiner

UNITED STATES PATENTS

| | | | |
|---|---|---|---|
| 1,556,222 | 10/1925 | King | 242—118.61 |
| 1,681,096 | 8/1928 | Clinton | 242—118.61 |
| 2,221,089 | 11/1940 | Githens et al. | 242—68.3 |
| 2,282,016 | 5/1942 | Wittel | 242—68.3 |
| 2,571,133 | 10/1951 | Haynes | 206—52 |
| 2,643,830 | 6/1953 | Paeplow et al. | 242—118.61 |
| 2,775,385 | 12/1956 | Gibbs | 206—52 |
| 2,823,573 | 2/1958 | Vasikonis et al. | 242—118.61 |
| 2,928,619 | 3/1960 | Burton et al. | 242—118.61 |
| 3,116,960 | 1/1964 | Olsson et al. | 248—27 |

FOREIGN PATENTS

| | | |
|---|---|---|
| 1,208,007 | 9/1959 | France. |

THERON E. CONDON, *Primary Examiner.*